United States Patent [19]

Landry et al.

[11] Patent Number: 5,280,056
[45] Date of Patent: Jan. 18, 1994

[54] UV STABLE COMPOSITIONS

[75] Inventors: Susan D. Landry; Jon S. Reed; F. Alexander Pettigrew, all of Baton Rouge, La.

[73] Assignee: Ethyl Corporation, Richmond, Va.

[21] Appl. No.: 15,659

[22] Filed: Feb. 9, 1993

[51] Int. Cl.$^5$ .............................................. C08K 5/32
[52] U.S. Cl. ..................................................... 524/94
[58] Field of Search ........................... 524/94; 548/462

[56] References Cited

U.S. PATENT DOCUMENTS

| | | | |
|---|---|---|---|
| 3,368,997 | 2/1968 | Gordon | 260/45.8 |
| 3,624,024 | 11/1971 | Caldwell et al. | 260/40 R |
| 3,868,388 | 2/1975 | Dotson, Jr. et al. | |
| 3,900,442 | 8/1975 | Zannucci et al. | 260/42.46 |
| 3,901,848 | 8/1975 | Dibattista et al. | 260/45.8 N |
| 3,915,930 | 10/1975 | Dotson, Jr. et al. | 524/94 |
| 3,935,163 | 1/1976 | Spivack et al. | 260/45.75 N |
| 3,981,856 | 9/1976 | Hudgin et al. | 526/4 |
| 4,080,404 | 3/1978 | Deets | 260/876 R |
| 4,092,345 | 5/1978 | Wolford et al. | 548/462 |
| 4,173,561 | 11/1979 | Tabana et al. | 260/45.75 B |
| 4,226,999 | 10/1980 | Malherbe et al. | 546/222 |
| 4,366,276 | 12/1982 | Freitag et al. | 524/94 |
| 4,374,220 | 2/1983 | Sonnenberg | 524/94 |
| 4,467,062 | 8/1984 | Hornbaker et al. | 524/94 |
| 4,535,170 | 8/1985 | Sonnenberg | 548/462 |
| 4,546,126 | 10/1985 | Breitenfellner et al. | 523/216 |
| 4,581,396 | 4/1986 | Sonnenberg | 524/87 |
| 4,590,221 | 5/1986 | Kuhnel et al. | 521/85 |
| 4,871,863 | 10/1989 | Khuddus | 548/462 |
| 4,873,341 | 10/1989 | Anderson | 548/462 |
| 4,914,212 | 4/1990 | Khuddus et al. | 548/461 |
| 4,925,888 | 5/1990 | Aumueller et al. | 524/91 |
| 4,990,626 | 2/1991 | Hutchinson et al. | 548/462 |
| 4,992,557 | 2/1991 | Hutchinson et al. | 548/462 |
| 5,025,050 | 6/1991 | Torres | 524/94 |
| 5,049,601 | 9/1991 | Khuddus | 524/94 |
| 5,118,739 | 6/1992 | Sutker et al. | 524/164 |
| 5,137,948 | 8/1992 | Bonnet et al. | 524/94 |

FOREIGN PATENT DOCUMENTS

| | | | |
|---|---|---|---|
| 0119041 | 9/1975 | Japan | 524/94 |
| 2011915 | 7/1979 | United Kingdom . | |

OTHER PUBLICATIONS

Defensive Publication, United States Patent and Trademark Office, Published Feb. 3, 1976, T943,009, Stabilized Spandex Polymers; U.S. Cl. 260-45.8 NT.

Kirk-Othmer Encyclopedia of Chemical Technology, Third Edition, 1983, vol. 23, "UV Stabilizers", pp. 615 through 627.

Primary Examiner—Kriellion S. Morgan
Attorney, Agent, or Firm—David E. LaRose

[57] ABSTRACT

This invention relates to a method for increasing the ultraviolet light stability of articles made from macromolecular materials comprising: forming a flame-retarded formulation containing macromolecular material and a mixture of (i) a first alkylenebis(tetrabromophthalimide) flame retardant having a yellowness index (YI) value ranging from about 20 to about 40 as determined by ASTM D-1925; and (ii) a second alkylenebis(tetrabromophthalimide) flame retardant having a yellowness index (YI) value (ASTM D-1925) ranging from about 2 to about 15 whereby the uv stability of a test plaque made from the flame-retarded formulation is greater than the arithmetic average of the uv stabilities of a test plaque made from a flame-retarded formulation containing (i) but not (ii) and of a test plaque made from a flame-retarded formulation containing (ii) but not (i).

14 Claims, No Drawings

UV STABLE COMPOSITIONS

BACKGROUND

This invention relates to a unique blend of flame retardant components which provide a synergistic increase in ultraviolet (uv) stability of articles made from polymeric formulations containing the flame retardant components.

Typically, the uv stability of polymeric materials is provided by uv stabilizers which are colorless or nearly colorless organic substances. Ultraviolet radiation contains a quantum of energy sufficient to exceed the dissociation energy of covalent bonds found in polymeric materials. Without the use of uv stabilizers, visible light containing uv radiation tends to cause polymeric materials to discolor and become brittle; protective coatings to crack, chalk, and delaminate; and dyes and pigments to fade. Accordingly, additives which increase the light stability of flame-retarded formulations are generally required. For the purposes of this invention, the term "uv stability" shall also refer to the light stability of the formulation, blend, or articles made from such formulations or blends.

Classes of compounds used to reduce light-induced degradation of polymeric materials, include uv absorbers, hindered amines, nickel chelates, hindered phenols, and aryl esters. Commercially available uv absorbers include derivatives of 2-hydroxybenzophenones, 2-(2'-hydroxyphenyl)benzotriazoles, diphenylacrylates and oxalanilides. Hindered amine light stabilizers (HALS) include bis(2,2,6,6,-tetramethyl-4-piperidinyl) sebacate, CHIMASSORB® 944, and TINUVIN® 622. Depending on their structures, nickel chelates, such as CYASORB® UV 1084, IRGASTAB® 2002, and nickel dialkyldithiocarbamates, contribute to light stabilization of polymeric substances by decomposing hydroperoxides, scavenging free radicals, absorbing uv radiation, and quenching photoexcited chromophores. Suitable aryl esters include resorcinol monobenzoate, phenyl salicylate, substituted aryl salicylates, diaryl terephthalates, and isophthalates.

While the use of uv stabilizer additives provides a significant increase in the uv stability of polymeric materials containing them, there continues to be a need to increase the uv stability of macromolecular formulations without increasing the amount of uv stabilizer additive required.

THE INVENTION

It has been discovered, inter alia, that the uv stability of articles made from macromolecular formulations can be enhanced by forming a flame-retarded formulation containing macromolecular material and a combination or mixture of (i) a first alkylenebis(tetrabromophthalimide) flame retardant having a yellowness index (YI) value ranging from about 20 to about 40 as determined by ASTM D-1925; and (ii) a second alkylenebis(tetrabromophthalimide) flame retardant having a yellowness index (YI) value (ASTM D-1925) ranging from about 2 to about 15. Surprisingly, the uv stability of a test plaque made from the resulting flame-retarded formulation has been found to be greater than the arithmetic average of the uv stabilities of a test plaque made from a flame-retarded formulation containing (i) but not (ii) and of a test plaque made from a flame-retarded formulation containing (ii) but not (i). This more than proportionate increase in uv stability was totally unexpected, since the YI value of a test plaque made from a macromolecular formulation containing (i) and (ii) is substantially the same as the arithmetic average of the YI values of a test plaque made from a flame-retarded formulation containing (i) but not (ii) and of a test plaque made from a a flame-retarded formulation containing (ii) but not (i).

In another embodiment, this invention provides a flame-retarded macromolecular formulation having enhanced uv stability. The formulation comprises: (a) macromolecular material and (b) a flame retardant amount of a flame retardant combination or mixture containing (i) a first alkylenebis(tetrabromophthalimide) flame retardant having a yellowness index (YI) as determined by ASTM D-1925 ranging from about 20 to about 40; and (ii) a second alkylenebis(tetrabromophthalimide) flame retardant having a yellowness index (YI) value (ASTM D-1925) ranging from about 2 to about 15 provided the uv stability of test plaques made from the flame-retarded formulation is greater than the arithmetic average of the uv stabilities of a test plaque made from a flame-retarded formulation containing (i) but not (ii) and of a test plaque made from a flame-retarded formulation containing (ii) but not (i).

The macromolecular material used in the methods and formulations of this invention may be cellulosic materials or polymeric materials. Illustrative polymers are: olefin polymers, cross-linked and otherwise, for example, homopolymers of ethylene, propylene, and butylene; copolymers of two or more of such alkylene monomers and copolymers of one or more of such alkylene monomers and any other copolymerizable monomers, for example, ethylene/propylene copolymers, ethylene/ethyl acrylate copolymers and ethylene/vinyl acetate copolymers; polymers of olefinically unsaturated monomers, for example, polystyrene, e.g. high impact polystyrene, and styrene copolymers; polyurethanes; polyamides; polyimides; polycarbonates; polyethers; acrylic resins; polyesters, especially poly(ethyleneterephthalate) and poly(butyleneterephthalate); epoxy resins; alkyls; phenolics; elastomers, for example, butadiene/styrene copolymers and butadiene/acrylonitrile copolymers; terpolymers of acrylonitrile, butadiene and styrene; natural rubber; butyl rubber; and polysiloxanes. The polymer may also be a blend of various polymers. Further, the polymer may be, where appropriate, cross-linked by chemical means or by irradiation. Particularly preferred macromolecular materials are high impact polystyrene, and acrylonitrile/butadiene/styrene terpolymers.

For the purposes of this invention, the alkylene group of the alkylenebis(tetrabromophthalimides) contain from 2 to 6 carbon atoms. Commercially available alkylenebis(tetrabromophthalimides) include N,N'-1,2-ethylenebis(3,4,5,6-tetrabromophthalimide). Accordingly, the first alkylenebis(tetrabromophthalimide) having a YI value ranging from about 20 to about 40 may be made in accordance with U.S. Pat. No. 4,092,345 or obtained commercially from Ethyl Corporation as SAYTEX® BT-93® flame retardant. The second alkylenebis(tetrabromophthalimide) having a YI value ranging from about 2 to about 15 may be made in accordance with U.S. Pat. Nos. 4,125,535; 4,914,212; 4,992,557; or 4,990,626 or obtained commercially from Ethyl Corporation as SAYTEX® BT-93®W flame retardant.

When preparing the formulations of this invention, conventional blending or mixing techniques can be used. Such techniques include the use of a single or twin screw extruder, a high intensity mixer, or a continuous mixer.

Typically, the macromolecular formulation will contain from about 75 to about 99 wt.% macromolecular material, preferably from about 80 to about 99 wt.% macromolecular material, and from about 1 to about 25 wt.% of flame retardant combination or mixture, preferably from about 1 to about 20 wt.% of the flame retardant combination or mixture. Other additives may be used in the formulation such as flame retardant synergists, antioxidants, plasticizers, fillers, pigments, UV stabilizers, dispersants, melt flow improvers, and the like.

The flame retardant combination or mixture of (i) and (ii) may be formed and then added in a flame retarding amount to the macromolecular material or both flame retardants may be added to the macromolecular material individually to form the flame-retarded macromolecular formulation in situ. Accordingly, the order of introduction of the flame retardants (i) and (ii) is not critical to the invention as they can be added in any order.

The flame retardant combination or mixture may contain from 1 to about 99 wt. % of the first flame retardant, and from about 99 to about 1 wt.% of the second flame retardant. Preferably, the flame retardant combination contains from about 50 to about 85 wt.% of the first flame retardant, and from about 50 to about 15 wt.% of the second flame retardant, and most preferably there is about a 3:1 weight ratio of the first flame retardant to the second flame retardant in the flame retardant combination or mixture. Notwithstanding the ratio of the first flame retardant to the second flame retardant selected for any flame-retarded macromolecular formulation, it is critical that the uv stability of a test plaque made from the flame-retarded formulation be greater than the arithmetic average of the uv stabilities of a test plaque made from a flame-retarded formulation containing (i) but not (ii) and of a flame-retarded formulation containing (ii) but not (i). In the most preferred embodiment, the uv stability of a test plaque made from the flame-retarded formulation is greater than the uv stability of test plaques made from flame-retarded formulations containing either (i) or (ii).

The uv stability of macromolecular formulation may be determined using any one or more techniques typically used in the polymer industry. Such techniques include the 100 hour and 300 hour xenon arc test according to ASTM D-4459, the Hewlett Packard uv (HPUV) test according to ASTM D-4674, and the like. The test for determining uv stability is not critical to the invention, provided the test is generally accepted in the industry and provides reasonably reproducible results.

The Y.I. values for test plaques made from the flame-retarded formulations as disclosed herein were obtained in accordance with ASTM D 1925 using a HunterLab Model Colorquest® integrated sphere. Y.I. values are calculated values, i.e. Y.I.=100(0.72a+1.79b)/L, wherein the values for "a","b", and "L" are observed values. The "a" value measures redness when a plus value, gray when zero and greenness when a negative value. The "b" value measures yellowness when a plus value, gray when zero and blueness when a minus value. The "L" value measures lightness and varies from 100, for perfect white, to 0, for black. The "L" value is used by some in the industry to convey a sense of the degree of whiteness of a material. The Y.I. values for the powdered flame retardants and mixtures thereof were obtained generally in accordance with ASTM D 1925 using a Hunter-Lab model Colorquest® 45°/0°. The only (A) modification to the ASTM procedure, is that once the powdered sample is placed in the quartz sample cup, the cup is tapped on a paper note pad about 100 times within about one minute by raising the cup about 5 cm above the note pad and tapping it flat against the pad. This procedures is used so as to provide reproducible results.

While not desiring to be bound by theory, it is believed that there is a synergistic effect which increases the uv stability of flame-retarded macromolecular formulations containing the mixture of first and second flame retardants described herein. This synergistic effect results in greater uv stability of a test plaque made from a formulation containing (i) and (ii) than would have been expected from an arithmetic average of the uv stabilities of a test plaque made from a flame-retarded formulation containing (i) but not (ii) and a test plaque made from a flame-retarded formulation containing (ii) but not (i). By "arithmetic average" is meant the calculated average of the sum of the actual uv stabilities of test plaques made from the individual formulations, the first formulation (A) containing the first flame retardant (i), and the second formulation (B) containing the second flame retardant (ii). Accordingly, the arithmetic average can be calculated by the following formula:

$$uv \text{ stability (avg.)} = (uv \text{ stability of } A) \times (\text{wt. \% of } (i) \text{ in the flame retardant combination}) + (uv \text{ stability of } B) \times (\text{wt. \% of } (ii) \text{ in the flame retardant combination})$$

For example, a test plaque containing only flame retardant (i) has a uv stability of 35. A second test plaque containing only (ii) has a uv stability of 13. The arithmetic average uv stability for a test plaque made from a flame retardant combination containing 50 wt.% (i) and 50 wt.% (ii) based on the total weight of flame retardant is therefore 24 according to the above formula. (uv stability (avg.)=(0.5 wt.% ×35)+(0.5 wt.%×13)=24)

For the purposes of this invention the uv stability of a formulation is indicated by the $\Delta E$ values which are obtained by measuring the initial Hunter "L", "a" and "b" values of a test plaque containing flame retardant(s) by placing the test plaque made from a macromolecular formulation containing flame retardants (i) or (ii), or both (i) and (ii) in a HunterLab Colorquest® intergrated sphere. After exposing the test plaque to light in the xenon arc or HPUV tests for the prescribed period of time designated in the ASTM test procedure selected, the final Hunter "L", "a", "b" values are determined and the $\Delta E$ is calculated by the following formula:

$$uv \text{ stability } (\Delta E) = \sqrt{\Delta L^2 + \Delta a^2 + \Delta b^2}$$

wherein:
$\Delta L = L_{initial} - L_{final}$
$\Delta a = a_{initial} - a_{final}$
$\Delta b = b_{initial} - b_{final}$ Decreasing $\Delta E$ values indicate increasing uv stabilities which are more desirable. In order to further illustrate the advantages of this invention, the following example is given:

EXAMPLE

For each run, a 1000 gram batch of flame-retarded high impact polystyrene (HIPS) was prepared containing 4 wt. % $Sb_2O_3$ and the amount of each flame retardant (i) and (ii) indicated in the table. The balance of the formulation is HIPS. The powders and HIPS pellets were hand mixed in a plastic bag prior to extrusion. After mixing, the formulated resin was compounded on a Haake Buchler System 40 twin-screw extruder at 70 RPM having zone temperatures of 175°, 190°, 215°, and 215° C. The strand was then repelletized and injection molded in a Battenfeld BSKM 100/40 injection molder using a temperature profile of 199°, 221° and 227° C. The mold temperature was 48° C., while the injection pressure was about 1815 psia (12.5 MPa). Hunter values were determined for the test plaques thus prepared before and after exposing the plaques to uv radiation according to ASTM test procedures HPUV (D-4674) and 300 hour xenon arc (D-4459). Hunter values of the flame retardant powder mixtures were also determined.

TABLE

| | Run 1 | Run 2 | Run 3 | Run 4 | Run 5 |
|---|---|---|---|---|---|
| Formulation | | | | | |
| HIPS resin (wt. %) | 84 | 84 | 84 | 84 | 84 |
| SAYTEX ® BT-93 ® FR (wt. %) | 12 | 9 | 6 | 3 | 0 |
| SAYTEX ® BT-93 ®W FR (wt. %) | 0 | 3 | 6 | 9 | 12 |
| $Sb_2O_3$ (wt. %) | 4 | 4 | 4 | 4 | 4 |
| Initial Hunter Values of test plaques (HPUV) | | | | | |
| L | 90.62 | 89.33 | 89.62 | 90.08 | 90.63 |
| a | −5.86 | −4.25 | −3.62 | −2.68 | −1.09 |
| b | 21.55 | 17.74 | 15.77 | 12.99 | 8.57 |
| YI | 37.65 | 31.99 | 28.51 | 23.66 | 16.14 |
| Final Hunter Values of test plaques (HPUV) | | | | | |
| L | 88.92 | 88.29 | 88.23 | 88.07 | 87.99 |
| a | −2.91 | −2.53 | −2.32 | −2.02 | −1.48 |
| b | 20.97 | 19.11 | 18.09 | 16.93 | 14.18 |
| YI | 35.59 | 36.45 | 34.60 | 32.60 | 27.52 |
| ΔE | 3.5 | 2.4 | 3.0 | 4.5 | 6.2 |
| ΔE (arithmetic average) | 3.5 | 4.18 | 4.85 | 5.52 | 6.2 |
| Initial Hunter Values of test plaques (300 hour xenon arc) | | | | | |
| L | 90.69 | 89.24 | 89.70 | 89.94 | 90.60 |
| a | −5.83 | −4.22 | −3.62 | −2.72 | −1.13 |
| b | 21.55 | 17.72 | 15.64 | 13.04 | 8.72 |
| YI | 37.66 | 32.00 | 28.23 | 23.76 | 16.41 |
| Final Hunter Values of test plaques (300 hour xenon arc) | | | | | |
| L | 86.22 | 85.57 | 85.12 | 83.86 | 83.83 |
| a | −1.16 | −1.08 | −0.86 | −0.48 | −0.46 |
| b | 23.26 | 20.88 | 19.96 | 19.21 | 17.81 |
| YI | 47.08 | 42.61 | 41.11 | 40.49 | 37.56 |
| ΔE | 6.7 | 5.8 | 6.9 | 8.9 | 11.4 |
| ΔE (arithmetic average) | 6.7 | 7.88 | 9.05 | 10.22 | 11.4 |
| Hunter values of flame retardant | | | | | |
| L | 90.8 | 90.0 | 89.6 | 89.0 | 88.6 |
| a | −5.4 | −4.9 | −4.2 | −3.1 | −0.8 |
| b | 17.0 | 15.6 | 13.3 | 10.2 | 5.2 |
| YI | 29.2 | 27.0 | 23.2 | 18.0 | 9.8 |

As indicated in the foregoing table, the uv stabilities of runs 2, 3, and 4 are greater than the arithmetic average of the uv stabilities of test plaques made from the formulations containing the individual flame retardants. This result was totally unexpected.

Variation of the invention are within the spirit and scope of the appended claims.

What is claimed is:

1. A method for increasing the ultraviolet light stability of articles made from macromolecular materials comprising: forming a flame-retarded formulation containing macromolecular material and a combination of (i) a first alkylenebis(tetrabromophthalimide) flame retardant having a yellowness index (YI) value ranging from about 20 to about 40 as determined by ASTM D-1925; and (ii) a second alkylenebis(tetrabromophthalimide) flame retardant having a yellowness index (YI) value (ASTM D-1925) ranging from about 2 to about 15 whereby the uv stability of a test plaque made from the flame-retarded formulation is greater than the arithmetic average of the uv stabilities of a test plaque made from a flame-retarded formulation containing (i) but not (ii) and of a test plaque made from a flame-retarded formulation containing (ii) but not (i).

2. The method of claim 1 wherein the uv stabilities are determined by a 300 hour xenon arc test according to ASTM D-4459.

3. The method of claim 1 wherein the macromolecular formulation contains from about 1 to about 20 wt. % of (i) plus (ii) based on the total weight of macromolecular material and flame retardant (i) and (ii).

4. The method of claim 3 wherein the weight ratio of (i) to (ii) in the macromolecular formulation is about 3:1.

5. The method of claim 1 wherein the weight ratio of (i) to (ii) in the macromolecular formulation is about 3:1.

6. The method of claim 1 wherein the macromolecular material is high impact polystyrene resin.

7. The method of claim 1 wherein the macromolecular material is acrylonitrile/butadiene/styrene terpolymer.

8. A flame-retarded macromolecular formulation having enhanced uv stability comprising: (a) macromolecular material and (b) a flame retardant amount of a flame retardant combination containing (i) a first alkylenebis(tetrabromophthalimide) flame retardant having a yellowness index (YI) as determined by ASTM D-1925 ranging from about 20 to about 40 ; and (ii) a second alkylenebis(tetrabromophthalimide) flame retardant having a yellowness index (YI) value (ASTM D-1925) ranging from about 2 to about 15 provided the uv stability of the a test plaque made from flame-retarded formulation is greater than the arithmetic average of the uv stabilities of a test plaque made from a flame-retarded formulation containing (i) but not (ii) and of a test plaque made from a flame-retarded formulation containing (ii) but not (i).

9. The formulation of claim 8 wherein the uv stabilities are determined by a 300 hour xenon arc test according to ASTM D-4459.

10. The formulation of claim 8 wherein the flame retardant amount ranges from about 1 to about 20 wt. % of total weight of resin plus flame retardant (i) and (ii).

11. The formulation of claim 10 wherein the weight ratio of (i) to (ii) in the macromolecular formulation is about 3:1.

12. The formulation of claim 8 wherein the weight ratio of (i) to (ii) in the macromolecular formulation is about 3:1.

13. The formulation of claim 11 wherein the macromolecular material is high impact polystyrene.

14. The formulation of claim 11 wherein the macromolecular material is acrylonitrile/butadiene/styrene terpolymer.

* * * * *